(12) United States Patent
Kageyama

(10) Patent No.: US 10,199,663 B2
(45) Date of Patent: Feb. 5, 2019

(54) CELL STRUCTURE FOR FUEL CELL STACK

(71) Applicant: NISSAN MOTOR CO., LTD., Yokohama-shi, Kanagawa (JP)

(72) Inventor: Kazuhiro Kageyama, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/785,533

(22) PCT Filed: Mar. 24, 2014

(86) PCT No.: PCT/JP2014/058032
§ 371 (c)(1),
(2) Date: Oct. 19, 2015

(87) PCT Pub. No.: WO2014/174959
PCT Pub. Date: Oct. 30, 2014

(65) Prior Publication Data
US 2016/0072136 A1    Mar. 10, 2016

(30) Foreign Application Priority Data

Apr. 22, 2013  (JP) .................................. 2013-089134

(51) Int. Cl.
*H01M 8/0273*   (2016.01)
*H01M 8/2483*   (2016.01)
(Continued)

(52) U.S. Cl.
CPC ....... *H01M 8/0273* (2013.01); *H01M 8/0276* (2013.01); *H01M 8/1004* (2013.01);
(Continued)

(58) Field of Classification Search
CPC ..... H01M 8/02; H01M 8/0273; H01M 8/0276
See application file for complete search history.

(56) References Cited

U.S. PATENT DOCUMENTS 7,977,011 B2   7/2011  Inagaki
9,225,032 B2  12/2015  Sugiura et al.
(Continued)

FOREIGN PATENT DOCUMENTS

CA        2359712 A1    4/2002
CA        2637061 A1    7/2007
(Continued)

*Primary Examiner* — Basia A Ridley
*Assistant Examiner* — Heng M. Chan
(74) *Attorney, Agent, or Firm* — Foley & Lardner LLP

(57) ABSTRACT

A cell structure for a fuel cell stack that is formed by stacking unit cells C each including a membrane electrode assembly 1 and a pair of separators 2 holding the membrane electrode assembly 1 therebetween. The membrane electrode assembly 1 includes a frame 3 in the periphery having such a size as to extend outward over the edges of the separators 2. Communication holes 21, 22 in communication with the front and back sides are formed in the frame 3 in an area from a sealing part 11 between frames 3 adjacent in the cell stacking direction to a sealing parts 12 between the membrane electrode assembly 1 and the separators 2. The air in a space Q formed between the inner and outer sealing parts 11, 12 is allowed to be released to the outside through the communication holes 21, 22, and a breakage of the adhesive of the sealing parts 11, 12 is thereby prevented.

23 Claims, 10 Drawing Sheets

(51) Int. Cl.
    *H01M 8/242*     (2016.01)
    *H01M 8/0276*   (2016.01)
    *H01M 8/1004*   (2016.01)
    *H01M 8/2465*   (2016.01)

(52) U.S. Cl.
    CPC ......... *H01M 8/242* (2013.01); *H01M 8/2465* (2013.01); *H01M 8/2483* (2016.02)

(56) References Cited

U.S. PATENT DOCUMENTS

| | | |
|---|---|---|
| 2007/0082251 A1 | 4/2007 | Inagaki |
| 2009/0286121 A1 | 11/2009 | Morimoto et al. |
| 2010/0196774 A1 | 8/2010 | Kawabata et al. |
| 2012/0178011 A1 | 7/2012 | Sugiura et al. |
| 2012/0270131 A1 | 10/2012 | Fukuta et al. |
| 2012/0295176 A1 | 11/2012 | Sugita et al. |
| 2014/0017593 A1 | 1/2014 | Abe et al. |

FOREIGN PATENT DOCUMENTS

| | | |
|---|---|---|
| CA | 2651007 A1 | 11/2007 |
| CA | 2637142 A1 | 2/2008 |
| CA | 2 801 416 A1 | 12/2011 |
| CA | 2 831 870 A1 | 10/2012 |
| CN | 102593477 A | 7/2012 |
| JP | 2005-190706 A | 7/2005 |
| JP | 2009-176621 A | 8/2009 |
| JP | 2010-129249 A | 6/2010 |
| JP | 2012-212560 A | 11/2012 |
| JP | 2012-243412 A | 12/2012 |
| JP | 2012-243615 A | 12/2012 |
| WO | WO 2009/144871 A1 | 12/2009 |

CELL STRUCTURE FOR FUEL CELL STACK

TECHNICAL FIELD

The present invention relates to a cell structure for a fuel cell stack formed by stacking a plurality of unit cells.

BACKGROUND ART

A conventional cell structure for a fuel cell stack is disclosed in Patent Document 1 titled as Fuel Cell Stack Structure. In the fuel cell stack structure disclosed in Patent Document 1, each cell (unit cell) is formed by sandwiching a membrane electrode assembly (MEA) between a pair of separators. The membrane electrode assembly includes a hard resin frame that sandwiches an electrolyte membrane in the periphery. The resin frame part serves as a non-power generating area. In the fuel cell stack structure, the cells are stacked to form a plurality of multi-cell modules. The plurality of multi-cell modules are arranged in series in the cell stacking direction, and the interface between the plurality of multi-cell modules is sealed by a bead gasket.

CITATION LIST

Patent Literature

Patent Document 1: Japanese Patent Unexamined Publication No. 2005-190706

SUMMARY OF THE INVENTION

Technical Problem

In order to decrease the thickness of each unit cell of such fuel cell stacks, there has been a proposal of a frame that is composed of a pair of thin films that sandwich the peripheral part of a membrane electrode assembly. In order to prevent a short circuit (liquid junction) between the unit cells due to external water such as rainwater and dew, each unit cell with this frame is configured such that the frame is slightly larger than the separators. Then, when the plurality of unit cells are stacked to form a fuel cell stack, adjacent frames are bonded to each other in the overall periphery so that the bonded part serves as a sealing part.

Needless to say, the above-described fuel cell stack has another sealing part between the membrane electrode assembly and the separators in the overall periphery. Along with the above-described sealing part between the frames, it therefore constitutes a double sealing structure in the periphery, and a closed space is formed between the outer and inner sealing parts. In such fuel cell stacks, when a load is applied in the cell stacking direction before an adhesive cures, the air confined in the closed space may push out and break a part of the adhesive applied in a line shape and be released to the outside. Therefore, it has been required to solve the problem.

The present invention was made in view of the above-described problem with the prior art, and an object thereof is to provide a cell structure for a fuel cell stack having a double sealing structure in the periphery that can prevent a breakage of an adhesive of its sealing part.

Solution to Problem

The cell structure for the fuel cell stack according to the present invention is a cell structure for a cell stack that is formed by stacking a plurality of unit cells each including a membrane electrode assembly and a pair of separators holding the membrane electrode assembly therebetween, wherein the membrane electrode assembly includes a peripheral frame having such a size as to extend outward over the edges of the separators. Further, the cell structure of the fuel cell stack is configured such that the fuel cell stack includes an outer sealing part that continues in an edge part of the frame along an overall periphery and an inner sealing part that continues in an edge part of the separators along an overall periphery, and a communication hole in communication with the front and back sides is formed in the frame in an area from a sealing part (bonded part) between frames adjacent in the cell stacking direction to a sealing part between the membrane electrode assembly and the separators. This configuration serves as a means for solving a problem with the prior art.

Advantageous Effects of Invention

The cell structure for the fuel cell stack according to the present invention allows the air in the area formed between the inner and outer sealing parts to be released to the outside through the communication hole, for example, even when a load is applied in the cell stacking direction in the production. Therefore, the cell structure can prevent a local increase of the air pressure, and thereby prevent a breakage of the adhesive of the sealing parts in fuel cell stacks having a double sealing structure in the periphery.

DESCRIPTION OF EMBODIMENTS

First Embodiment

Figure 1:
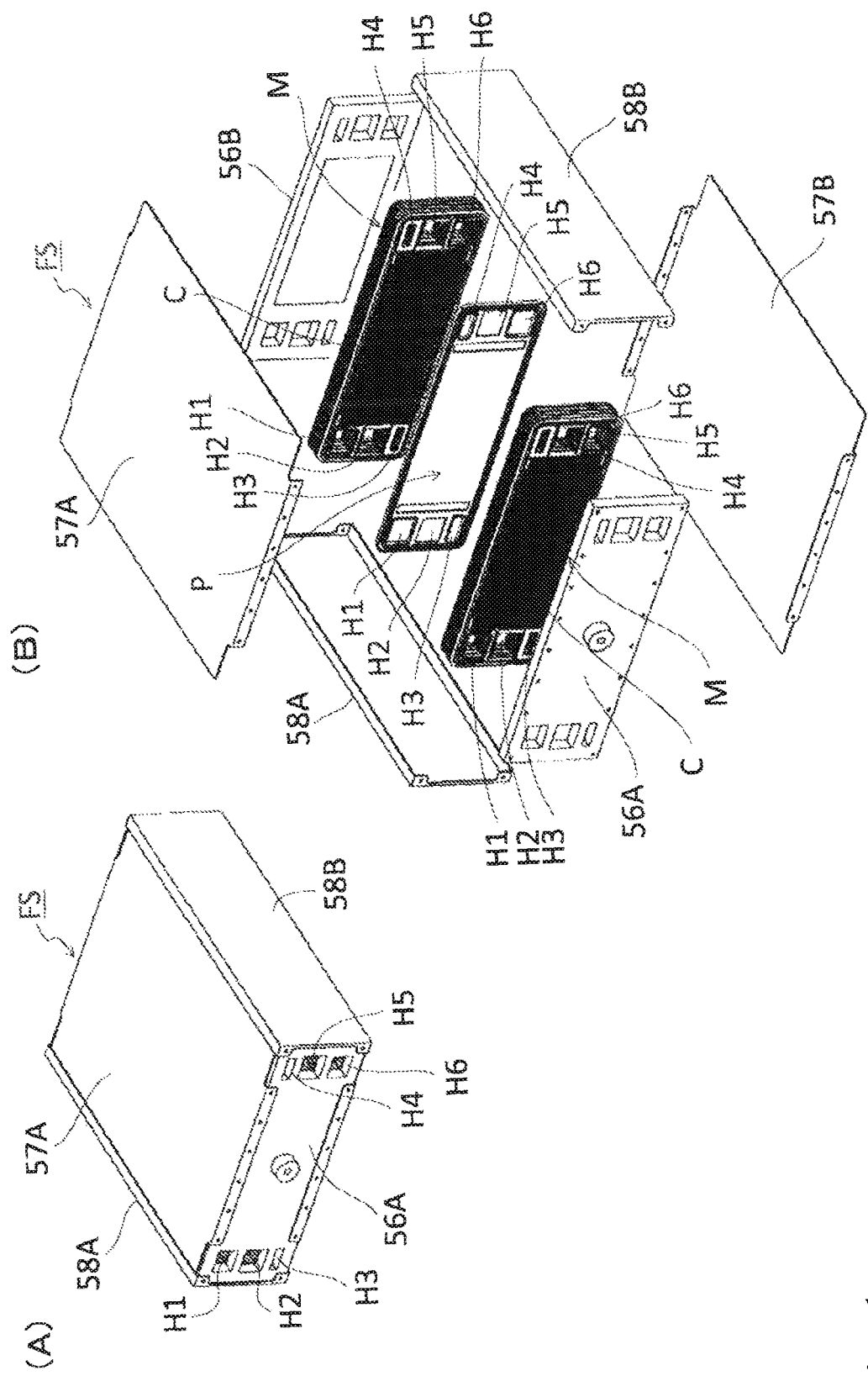
FIG. 1 are (A) a perspective view and (B) an perspective exploded view of a fuel cell stack.

A fuel cell stack FS of FIG. 1 includes, as particularly illustrated in FIG. 1 (B), at least two cell modules M each of which is formed by stacking a plurality of unit cells C and integrating them with each other, and a sealing plate P intervened between the cell modules M. The unit cells C and the sealing plate P of the illustrated example have rectangular shape with approximately the same size in length and width. While FIG. 1 (B) illustrates only two cell modules M and one sealing plate P, a larger number of cell modules M and sealing plates P are stacked in practice.

The fuel cell stack FS further includes end plates 56A, 56B disposed in both ends in the stacking direction of the cell modules M, fastening plates 57A, 57B disposed on both surfaces corresponding to the long sides of the unit cells C (the upper and lower surfaces in FIG. 1), and reinforcing plates 58A, 58B disposed on both surfaces corresponding to the short sides. The fastening plates 57A, 57B and the reinforcing plates 58A, 58B are coupled to both end plates 56A, 56B by bolts (not shown).

As described above, the fuel cell stack FS has a case-integrated structure as illustrated in FIG. 1 (A), in which the cell modules M and the sealing plate P are restrained and pressed in the stacking direction so that a predetermined contact pressure is applied on each of the unit cells C. With this structure, the gas sealing and the electrical conductivity are maintained at a high level.

Figure 2:
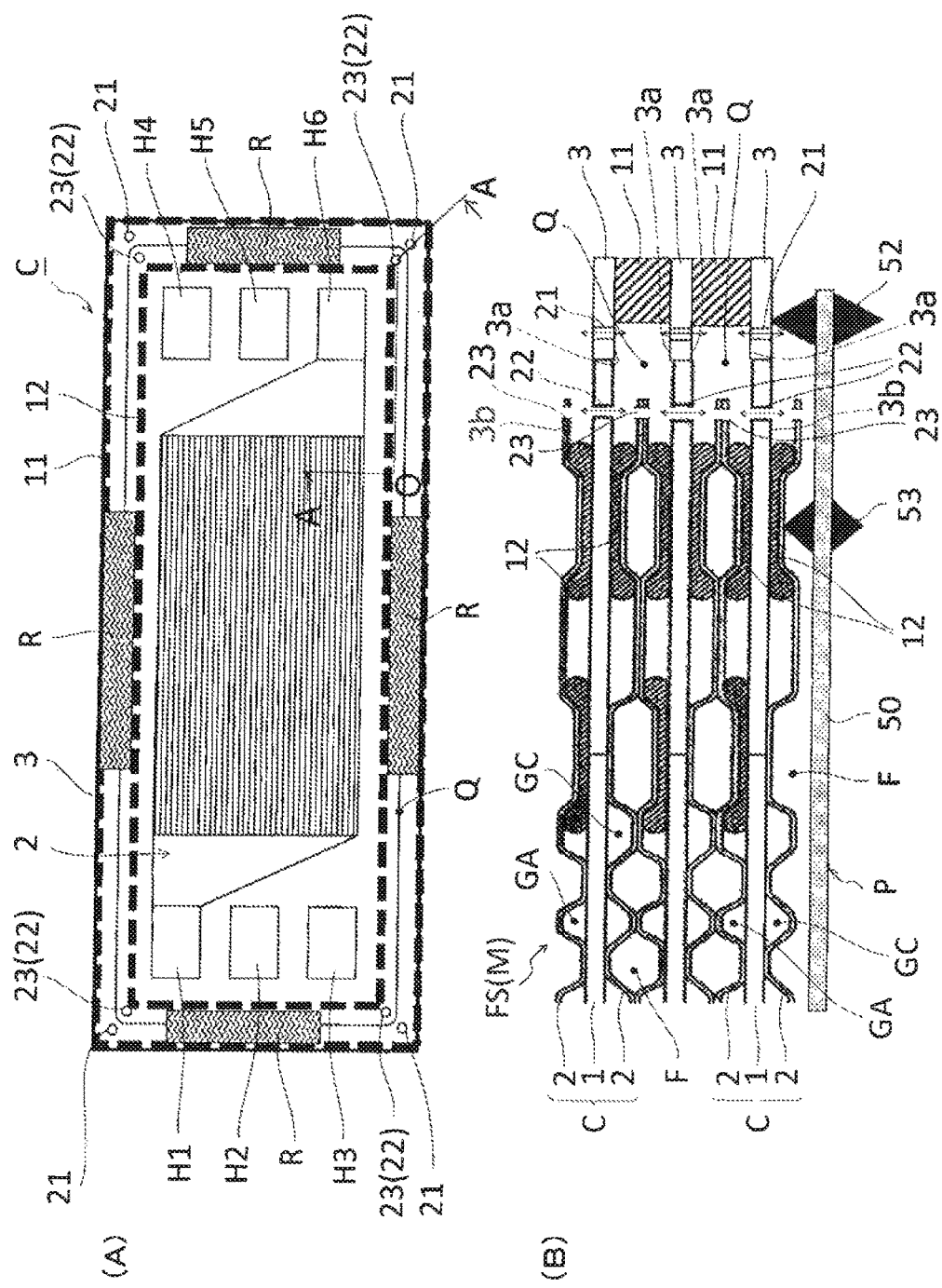
FIG. 2 are (A) a plan view of a separator and a membrane electrode assembly according to a first embodiment of the present invention and (B) a cross sectional view of a cell module taken along the line A-O-A in (A).

As illustrated in FIG. 2, each of the unit cells C includes a membrane electrode assembly 1, a pair of separators 2, 2 sandwiching the membrane electrode assembly 1. The membrane electrode assembly 1 and the separators 2, 2 form gas channels GC, GA respectively for cathode gas and anode gas therebetween.

The membrane electrode assembly 1, which is generally referred to as an MEA (membrane electrode assembly), includes an electrolyte layer of a solid polymer that is held between a cathode layer and an anode layer, although they are not shown in detail in the figure. The membrane electrode assembly 1 further includes a pair of thin resin films that sandwiches the peripheral part to serve as a frame 3. Examples of the material of the resin film includes, for example, polyethylene naphthalate (PEN), polypropylene (PP), polyethylene terephthalate (PET), polytetrafluoroethylene (PTFE), polyvinylidene fluoride (PVDF) and the like.

As illustrated in FIG. 2, the separators 2 are constituted by metal plates in which one plate has reversed faces to those of the other plate. For example, the separators 2 are made of stainless steel and may be formed in any suitable shape by press working. The separators 2 have an uneven cross-sectional shape at least in the part corresponding to the membrane electrode assembly 1. The uneven cross-sectional shape of the separators 2 continues in the length direction. The apexes of the corrugation are in contact with the membrane electrode assembly 1 while the valleys of the corrugation and the membrane electrode assembly 1 form the cathode and anode gas channels GC, GA therebetween.

As illustrated in FIG. 1 and FIG. 2, each of the unit cells C includes manifold holes H1 to H3 and H4 to H6, which are arranged such that each short side has three manifold holes. The manifold holes H1 to H6 are formed in the frame 3 of the membrane electrode assembly 1 and also in the separators 2 at the same location so that they are communicated with corresponding manifold holes when the unit cell C is assembled.

The manifold holes H1 to H3 on the left in FIG. 2 (A) are configured respectively to supply the cathode gas (H1), to discharge cooling fluid (H2) and to discharge the anode gas (H3) from the top. These manifold holes are communicated with corresponding manifold holes in the stacking direction to form respective manifolds. The manifold holes H4 to H6 on the right in FIG. 2 (A) are configured respectively to supply the anode gas (H4), to supply the cooling fluid (H5) and to discharge the cathode gas (H6) from the top. These manifold holes are communicated with corresponding manifold holes in the stacking direction to form respective manifolds. The positional relationship of the manifold holes H1 to H6 may be partly or fully reversed in respect of supply and discharge.

Although not shown in the figure, sealing members are disposed around the manifold holes H1 to H6. The sealing members, which also serve as an adhesive, airtightly join the membrane electrode assembly 1 (including the frame 3) with the separators 2. Further, the sealing members disposed around the manifold holes H1 to H6 have openings at suitable locations for supplying fluids to respective interlayer gaps while providing air-tightness of the respective manifolds.

A predetermined number of above-described unit cells C are stacked to form a cell module M. In this regard, two adjacent unit cells C form a channel F for cooling fluid (e.g. water) therebetween, and two adjacent cell modules M also form a channel F for cooling fluid therebetween. That is, the sealing plate P is disposed between the cell modules M, i.e. in the channel F for cooling fluid.

The sealing plate P has manifold holes H1 to H6 on both ends similar to the unit cells C. The plate base 50 is molded from a single electrically-conductive metal plate. The plate base 50 is formed in substantially the same shape and size as the above-described unit cells C in the plan view. Since the plate base 50 is constituted by the electrically-conductive metal plate, it can provide stable electrical connection over time.

The sealing plate P includes the sealing members (not shown) around the individual manifold holes H1 to H6, and an outer peripheral sealing member 52 and an inner peripheral sealing member 53 along the overall periphery of the plate base 50. The sealing members 52, 53 are disposed parallel to each other with a predetermined distance. The sealing plate P keeps back rainwater or the like from the outside by means of the outer peripheral sealing member 52 and prevents a leak of the cooling fluid flowing through the channel F between the cell modules M by means of the inner peripheral sealing member 53.

As described above, the cell structure for the fuel cell stack FS of the present invention is intended for the fuel cell stack FS that is formed by stacking the plurality of unit cells C each including the membrane electrode assembly 1 and the pair of separators 2, 2 holding the membrane electrode assembly 1 therebetween. The membrane electrode assembly 1 includes the frame 3 in the periphery having such a size as to extend outward over the edges of the separators 2.

That is, in order to decrease the thickness, each of the unit cells C includes the pair of thin films that sandwich the periphery of the membrane electrode assembly 1, and the film part serves as the frame 3. In each of the unit cells C with the frame 3, the frame 3 is designed slightly larger than the separators 2 as illustrated in FIG. 2 (A) in order to prevent a short circuit (liquid junction) between the unit cells due to external water such as rainwater and dew. When the unit cells C are stacked to form the fuel cell stack FS, adjacent frames 3 in the cell stacking direction are bonded to each other along the overall periphery, and the bonded part serves as a sealing part 11 as illustrated in FIG. 2 (B). For the sealing part 11, an adhesive that cures after application to develop an adhesion function and a sealing function is used.

Further, as described above, the membrane electrode assembly 1 and the separators 2 of each of the unit cells C are airtightly bonded to each other. As illustrated in FIG. 2, the edge part of the frame 3 of the membrane electrode assembly 1 is bonded to the separators 2 along the overall periphery. For the adhesion, an adhesive that cures after application to be a sealing part 12 is used as with the above-described adhesion of the frame 3. In FIG. 2 (A), the sealing parts 11, 12 are illustrated by dashed lines in order to distinguish them from outlines of the other components. However, they continue all over the periphery.

Accordingly, the unit cells C have a double sealing structure in the periphery by the sealing parts 11 and 12, and a ring space Q is formed between the inner and outer sealing parts, i.e. in an area from the sealing part 11 (bonded part) between frames 3 adjacent in the cell stacking direction to the sealing part 12 (bonded part) between the membrane electrode assembly 1 and the separators 2.

As described in the section of background art, in such double sealing structure, the air confined in the space Q may push out and break a part of the adhesive applied in a line shape and be released to the outside when a load is applied in the cell stacking direction before the adhesive cures. Further, even when the adhesive cures without a release of the air, the compressed air in the space Q may cause an extra stacking load or uneven surface pressure between the unit cells.

In contrast, in the cell structure of the fuel cell stack FS according to the present invention, each of the frames 3 has communication holes 21, 22 in communication with the front and back sides thereof in an area from the sealing part 11 between frames 3 adjacent in the cell stacking direction to the sealing part 12 between the membrane electrode assembly 1 and the separators 2.

The communication holes 21, 22 of the frames 3 are formed such that holes adjacent in the cell stacking direction are aligned in the cell stacking direction. Further, the communication holes 21, 22 are formed in a plurality of locations in each of the frames 3. It is desirable that the plurality of locations are apart from each other as far as possible.

Specifically, in each of the frames 3 of the present embodiment, the two communication holes 21, 22 are formed in each of the four corners of the rectangular shape, i.e. in four locations. One of the communication holes 21, 22 is an outer communication hole 21 that is formed in an area 3a opposed to adjacent frames 3 in the cell stacking direction, and the other is an inner communication hole 22 that is formed in an area 3b of the frame 3 opposed to the separators 2, in the frames 3, the outer communication holes 21 that are adjacent in the stacking direction are aligned in the cell stacking direction, and the inner communication holes 22 are similarly aligned in the cell stacking direction.

In this embodiment, each of the separators 2 has further communication holes 23 in communication with the front and back sides thereof in the area from the sealing part 11 between adjacent frames 3 in the cell stacking direction to the sealing part 12 between the membrane electrode assembly 1 and the separators 2. In the fuel cell stack FS, the anode separator 2 of a unit cell C is joined to the cathode separator 2 of an adjacent unit cell C. Accordingly, the communication holes 23 of the respective separators 2, 2 are formed in the same location.

The communication holes 23 of the respective separators 2 according to this embodiment are aligned in the cell stacking direction. As illustrated in FIG. 2 (B), they are also aligned with the inner communication holes 22 of the frames 3 in the cell stacking direction.

To produce the cell structure for the fuel cell stack FS having the above-described configuration, an adhesive is applied to the periphery of the frame 3 of a unit cell C, and thereafter the next unit cell C is stacked thereon to bond the respective frames 3 to each other, and these steps are repeated in the process of stacking the fuel cells C to produce the cell modules M and the fuel cell stack FS.

In the cell structure of the fuel cell stack FS, the communication holes 21, 22 in communication with the outside are formed in the frames 3 in the spaces Q between the inner and outer sealing parts 12 and 11. Accordingly, the spaces Q of all of the unit cells 1 are in communication with each other.

Therefore, in the cell structure for the fuel cell stack FS, even when a load is applied in the cell stacking direction in the production, the air in a space Q can be released to the outside (or to another space Q of an adjacent unit cell C) through the communication holes 21, 22 as illustrated by the arrows in FIG. 2 (B). Such release of the air occurs mutually in the unit cells C. In this way, a local increase of the air pressure does not occur in the cell structure of the fuel cell stack FS. Therefore, a breakage of the adhesive, in particular the adhesive of the sealing parts 11 between the frames 3 can be prevented in fuel cell stacks FS having a double sealing structure in the periphery.

Further, in the cell structure for the fuel cell stack FS, also after the applied adhesive cures to be the sealing parts 11, the air is not confined in a single space Q. Therefore, an extra stacking load and uneven surface pressure between the unit cells due to a compressed air are eliminated.

Further, in the cell structure for the fuel cell stack FS, the communication holes 21 to 23 are formed such that holes adjacent in the cell stacking direction are aligned in the cell stacking direction. Therefore, very good air flow is achieved between the spaces Q.

Further, in the cell structure for the fuel cell stack FS, the communication holes 21, 22 are formed in a plurality of locations in the frames 3. In this embodiment, the outer and inner communication holes 21, 22 are formed in each of the four corners of the rectangular shape (in four locations). Accordingly, in the cell structure for the fuel cell stack FS, even when the applied adhesive protrudes inward to separate a space as illustrated by the reference sign R in FIG. 2 (A), the space Q is not closed. Therefore, a breakage of the adhesive of the sealing parts 11 is prevented, and an extra stacking load and uneven surface pressure between the unit cells C are eliminated.

Further, in the cell structure for the fuel cell stack FS, the communication holes (outer communication holes) 21 are formed in the areas 3a of the frames 3 that are opposed to adjacent frames 3 in the cell stacking direction. This further facilitates the air flow between adjacent spaces Q. Further, in the cell structure for the fuel cell stack FS, the communication holes (inner communication holes) 22 are formed in the areas 3b of the frames 3 that are opposed to the separators 2. Accordingly, the separators 2 are intervened between adjacent communication holes 22. Therefore, water condensed from vapor produced in the membrane electrode assemblies 1 is less likely to flow in the cell stacking direction, and a short circuit (liquid junction) between the unit cells C due to the water can be prevented.

Since the above-described flow of the condensed water also depends on the position of the unit cells C, the location of the communication holes 21, 22 may be selected according to the position of the installed fuel cell stack FS. In the structure of this embodiment, the separators 2 also have the communication holes 23. That is, a higher priority is given to improving the air flow rather than preventing flow of the condensed water.

Further, in the cell structure for the fuel cell stack FS, the communication holes 23 are formed in the separators 2 as described above. Therefore, the communication holes 23 can be used as a holding hole in a surface treatment or a positioning hole in stacking the unit cells C. A holding hole in a surface treatment refers to, for example, a hole to which a hook for hanging the separators 2 on a bath bar is attached when the separators 2 are immersed in an electrolytic solution bath for the surface treatment.

Second Embodiment

Figure 3:
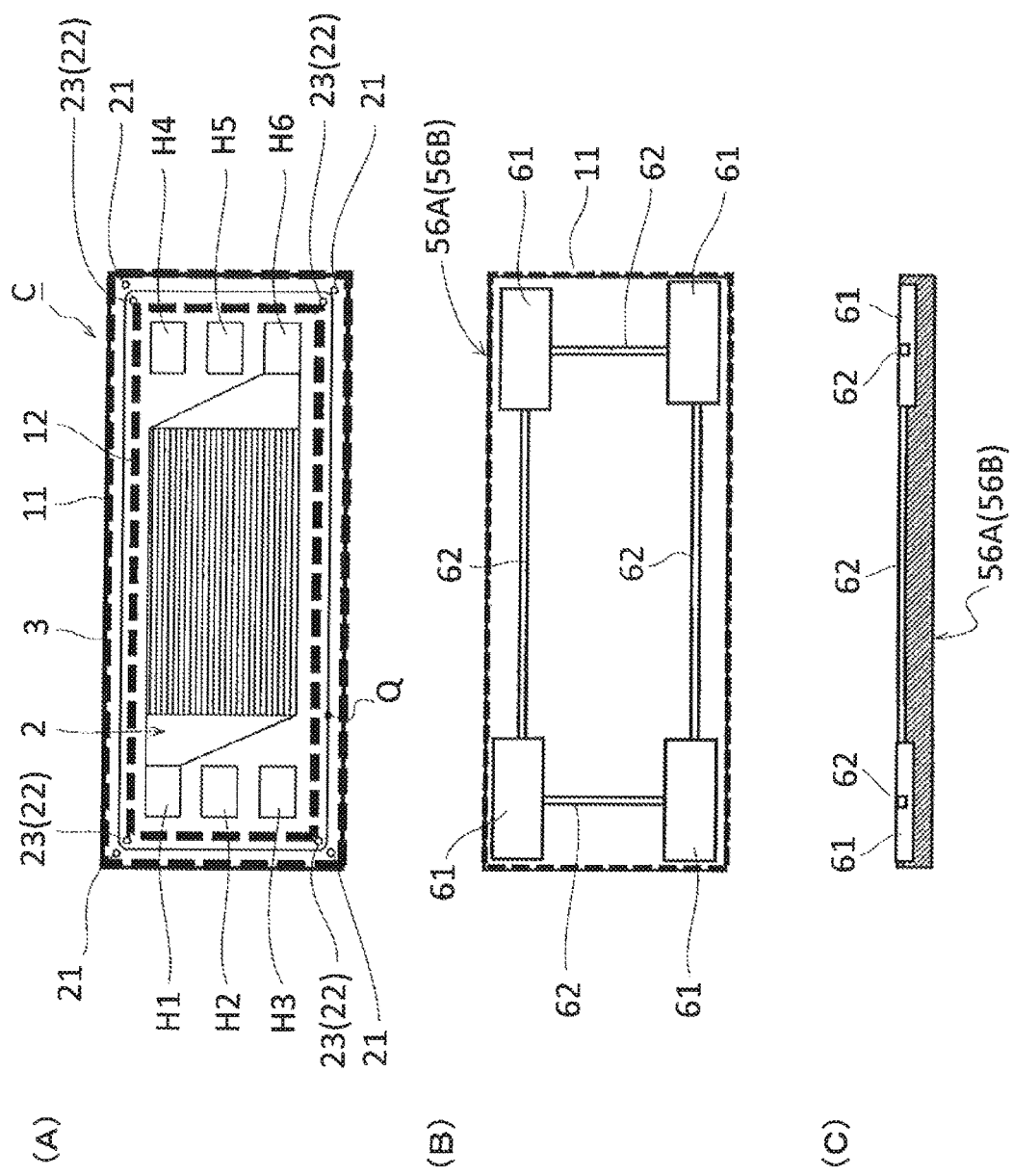
FIG. 3 are (A) a plan view of a separator and a membrane electrode assembly according to a second embodiment of the present invention, (B) a plan view of an end plate and (C) a cross sectional view of the end plate.

A unit cell C illustrated in FIG. 3 (A) has the same basic configuration as that of the first embodiment (see FIG. 2). In the cell structure for a fuel cell stack of this embodiment, communication holes 21, 22 are formed in a plurality of locations in each frame 3, i.e. in four locations corresponding to the four corners of the rectangular shape. As described above in FIG. 1 (B), the fuel cell stack includes end plates 56A, 56B that hold a stack of the unit cells C therebetween in the stacking direction.

As illustrated in FIG. 3 (B) and FIG. 3 (C), the end plate 56A (56B) of this embodiment includes recesses 61 that are disposed at locations corresponding to the communication holes 21, 22 for absorbing pressure and pathways 62 that provide communication between the recesses 61 for equalizing the pressure. That is, since the unit cells C have the communication holes 21, 22 in each of the four corners of the rectangular shape, the end plate 56A (56B) includes the recesses 61 for absorbing pressure similarly in the four corners and also include the four pathways 62 so that the recesses 61 are serially in communication with each other.

As with the interfaces between the frames 3, a sealing part 11 of an adhesive is also intervened between the edge part of the end plate 56A (56B) and the frame of the outermost unit cell C of a cell module M. Instead of this sealing part 11, a waterproof sealing of a sealing plate P may provide the same sealing function.

In the cell structure for the fuel cell stack having the above-described configuration, spaces Q of the respective unit cells C are not only in communication with each other but also in communication with the recesses 61 of the end plate 56A (56B). Therefore, in the cell structure for the fuel cell stack, even when a load in applied in the cell stacking direction in the production, the recesses 61 function as a volume space for absorbing the pressure. Further, in the cell structure for the fuel cell stack, the recesses 61 are in communication with each other through the pathways 62. Therefore, the air pressure of the recesses 61 is equalized.

In this way, the cell structure of the fuel cell stack can prevent a breakage of the adhesive due to a confined air and can also eliminate an extra stacking load and uneven surface pressure between the unit cells C due to localized air pressure in fuel cell stacks having a double sealing structure in the periphery.

Third Embodiment

Figure 4:
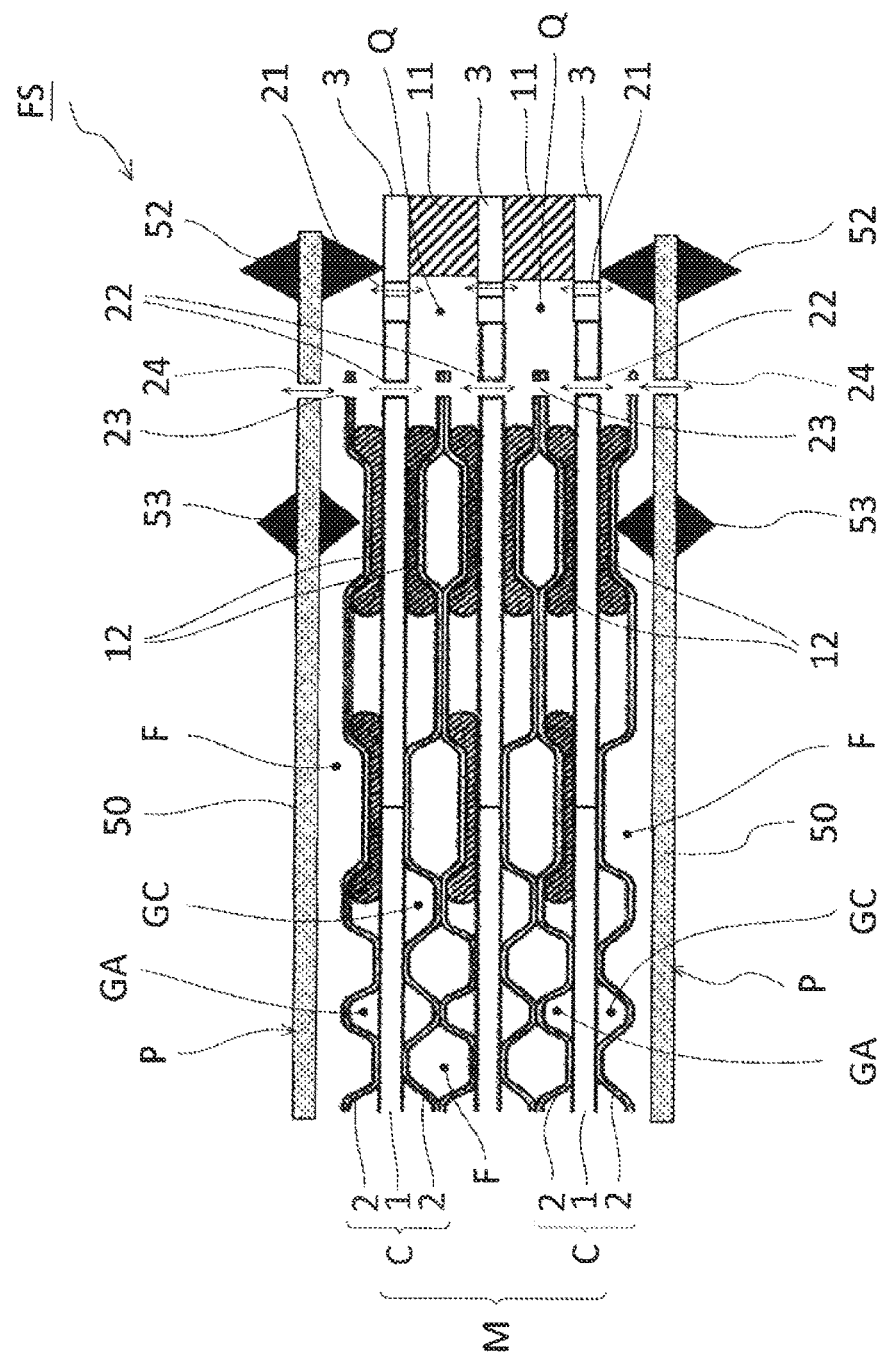
FIG. 4 is a cross sectional view of a cell module according to a third embodiment of the present invention.

A cell structure for a fuel cell stack of FIG. 4 has the same basic configuration as that of the second embodiment (see FIG. 3), in which a predetermined number of unit cells C are stacked to form a cell modules M, and a sealing plate P is intervened between the cell modules M.

The sealing plate P has communication holes 24 in communication with the front and back sides thereof and includes an outer peripheral sealing member 52 that is disposed in an outer side of the communication holes 24 and is in contact with the cell modules M. The communication holes 24 of the sealing plate P are formed in locations corresponding to inner communication holes 22 of frames 3 and communication holes 23 of separators 2.

In the cell structure for the fuel cell stack FS having the above-described configuration, spaces Q of the respective unit cells C of the cell modules M are in communication with each other as with the previous embodiments. In addition, the cell modules M are in communication with each other through the communication holes 24 of the sealing plate P. That is, the spaces Q of all unit cells C in the whole fuel cell stack FS are in communication with each other.

Therefore, the cell structure for the fuel cell stack FS can prevent a breakage of the adhesive due to confined air and also eliminate an extra stacking load and uneven surface pressure between the unit cells C due to localized air pressure in fuel cell stacks FS having a double sealing structure in the periphery.

Fourth Embodiment

Figure 5:
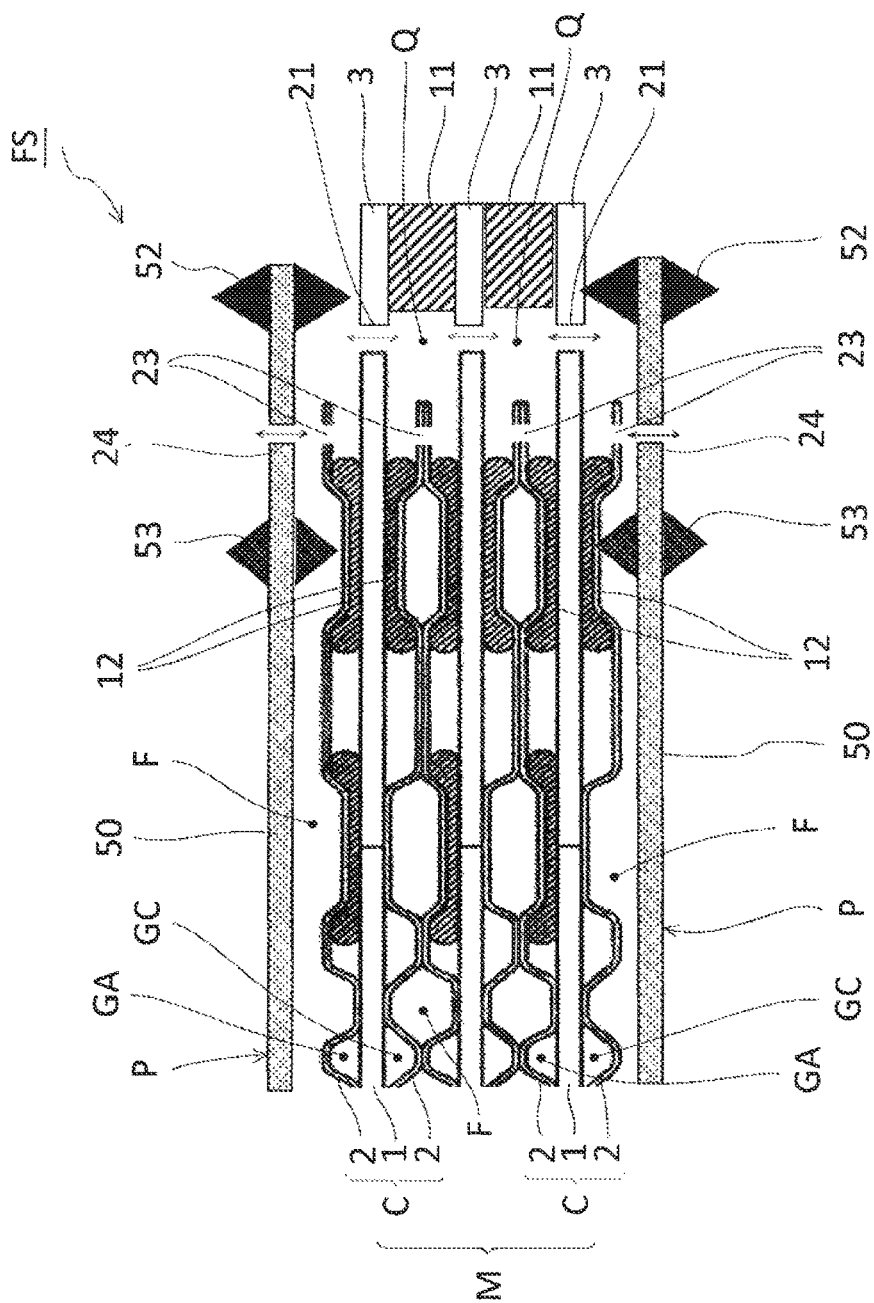
FIG. 5 is a cross sectional view of a cell module according to a fourth embodiment of the present invention.

The cell structure of a fuel cell stack FS of FIG. 5 has the same basic configuration as that of the third embodiment (see FIG. 4). Further, at least part of communication holes adjacent in the cell stacking direction are displaced relative to each other, in the frames 3 of the illustrated example, only outer communication holes 21 are formed. That is, in this embodiment, the frames 3 do not have inner communication holes (22), and the outer communication holes 21 and communication holes 23 of separators 2 are formed in a zigzag pattern.

As with the previous embodiments, the cell structure for the fuel cell stack FS having the above-described configuration can prevent a breakage of the adhesive due to confined air and also eliminate an extra stacking load and uneven surface pressure between the unit cells C due to localized air pressure. Furthermore, the outer communication holes 21 and the communication holes 23 of the separators 2 are formed in a zigzag pattern so that water condensed from vapor produced in membrane electrode assemblies 1 is less likely to flow in the cell stacking direction. Therefore, the cell structure of the fuel cell stack FS can prevent a short circuit (liquid junction) between the unit cells C due to the water.

While the communication holes adjacent in the cell stacking direction are aligned in the cell stacking direction in the previously-described first embodiment, at least part of the communication holes adjacent in the cell stacking direction are displaced relative to each other in this fourth embodiment.

In these configurations, communication holes adjacent in the cell stacking direction refer to not only communication holes respectively in the same components but also communication holes respectively in different components that are adjacent to each other in the stacking structure. That is, communication holes adjacent in the cell stacking direction refer to communication holes in respective frames 3, communication holes respectively in a frame 3 and a separator 2, communication holes in respective separators 2, communication holes respectively in a frame 3 and a sealing plate P, communication holes respectively in a separator 2 and a sealing plate P, or the like.

Fifth Embodiment

Figure 6:
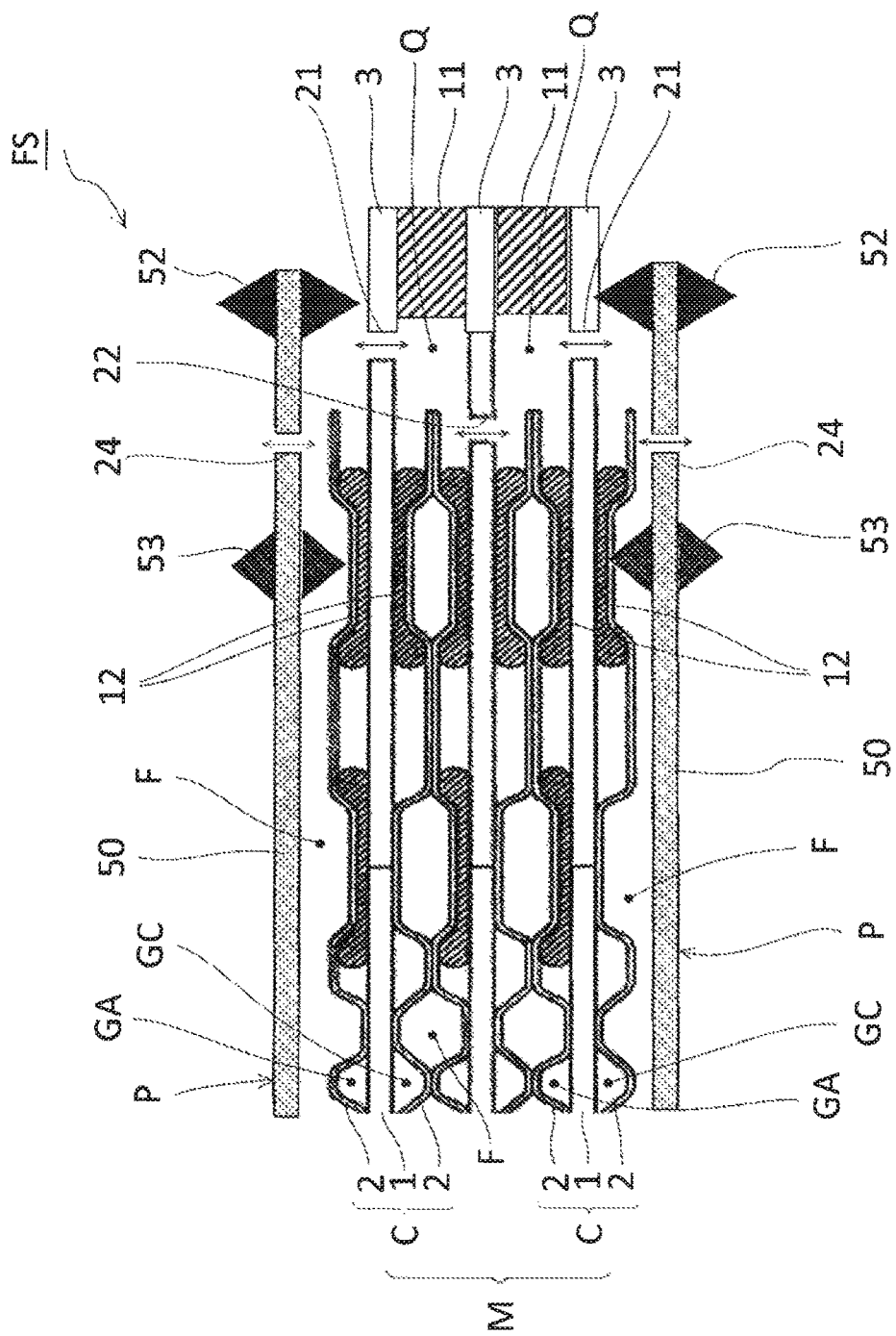
FIG. 6 is a cross sectional view of a cell module according to a fifth embodiment of the present invention.

The cell structure for a fuel cell stack FS of FIG. 6 has the same basic configuration as that of the fourth embodiment (see FIG. 5). Further, at least part of the communication holes adjacent in the cell stacking direction are displaced relative to each other. That is, in each cell module M, adjacent unit cells C alternately have outer communication holes 21 or inner communication holes 22, and separators 2 do not have a communication hole (23). Accordingly, in the cell structure for the fuel cell stack FS, the communication holes 21, 22 adjacent in the cell stacking direction are formed in a zigzag pattern.

As with the previous embodiments, the cell structure for the fuel cell stack FS having the above-described configuration can prevent a breakage of the adhesive due to confined air and also eliminate an extra stacking load and uneven surface pressure between the unit cells C due to localized air pressure. Furthermore, the outer communication holes 21 and the inner communication holes 22 are formed alternately in the cell stacking direction in a zigzag pattern so that water condensed from vapor produced in membrane electrode assemblies 1 is less likely to flow in the cell stacking direction. Therefore, the cell structure of the fuel cell stack FS can prevent a short circuit (liquid junction) between the unit cells C due to the water.

Sixth Embodiment

Figure 7:
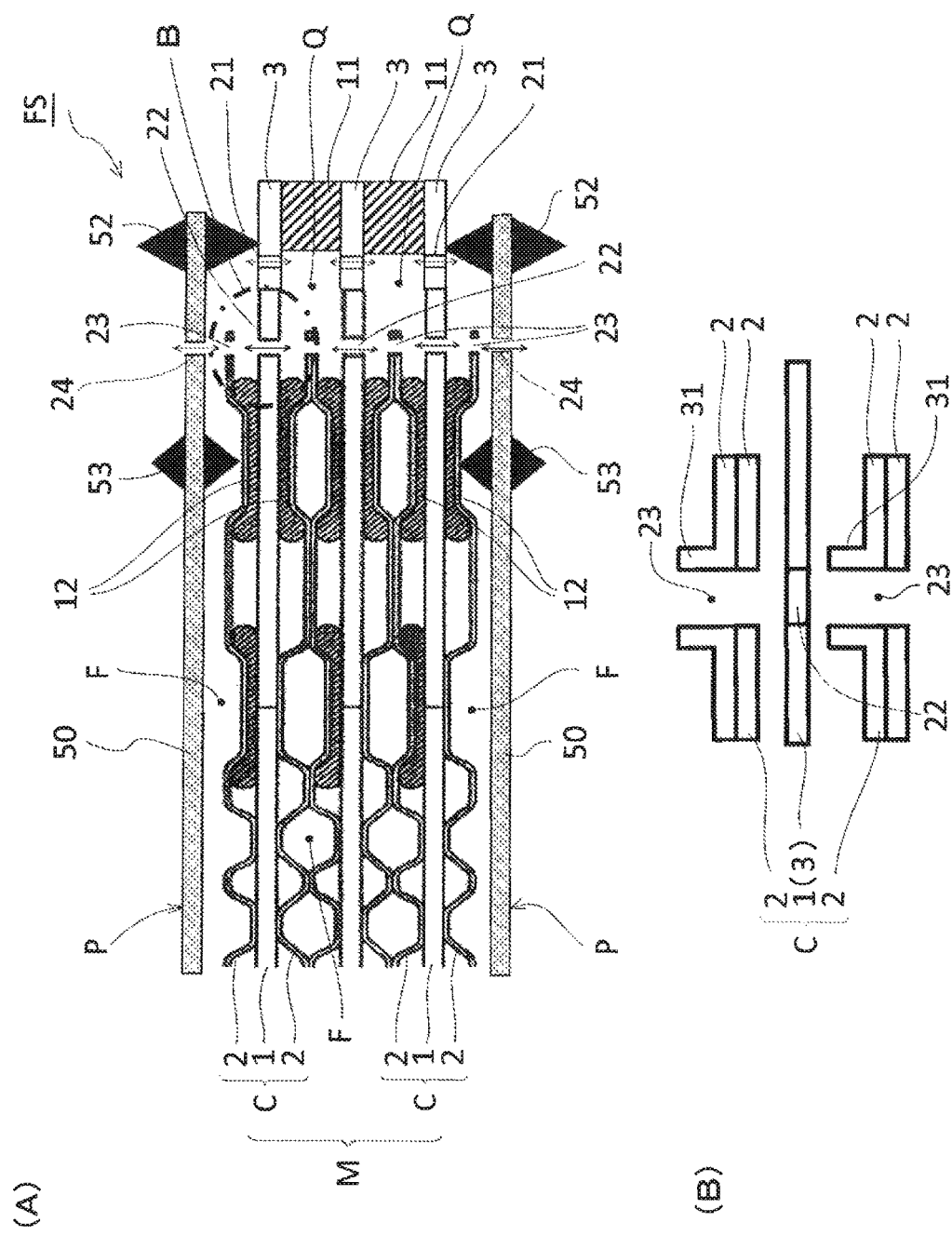
FIG. 7 are (A) a cross sectional view of a cell module according to a sixth embodiment of the present invention and (B) an enlarged cross sectional view of the area indicated by the circle B in (A).

The cell structure for a fuel cell stack FS of FIG. 7(A) has the same basic configuration as that of the third embodiment (see FIG. 4). Further, protrusions 31 for preventing liquid junction are formed along the rims of communication holes 23 as illustrated in FIG. 7 (B). FIG. 7 (B) is an enlarged cross sectional view of the area indicated by the circle B in (A). In this embodiment, an anode (or cathode) separator 2 of each unit cell C includes the ring protrusions 31. Such protrusions 31 can be formed by burring after boring or by flanging along with punching in the production of the separators 2.

Since the protrusions 31 are provided along the rims of the communication holes 23, the cell structure of the fuel cell stack having the above-described configuration can prevent water condensed from vapor produced in membrane electrode assemblies 1 from flowing out through the communication holes 23 by means of the protrusions 31 while it allows the air in spaces Q to be released to the outside as with the previous embodiments. In this way, the cell structure of the fuel cell stack makes the condensed water less likely to flow in the cell stacking direction and thereby prevents a short circuit (liquid junction) between the unit cells due to the water.

Seventh Embodiment

Figure 8:
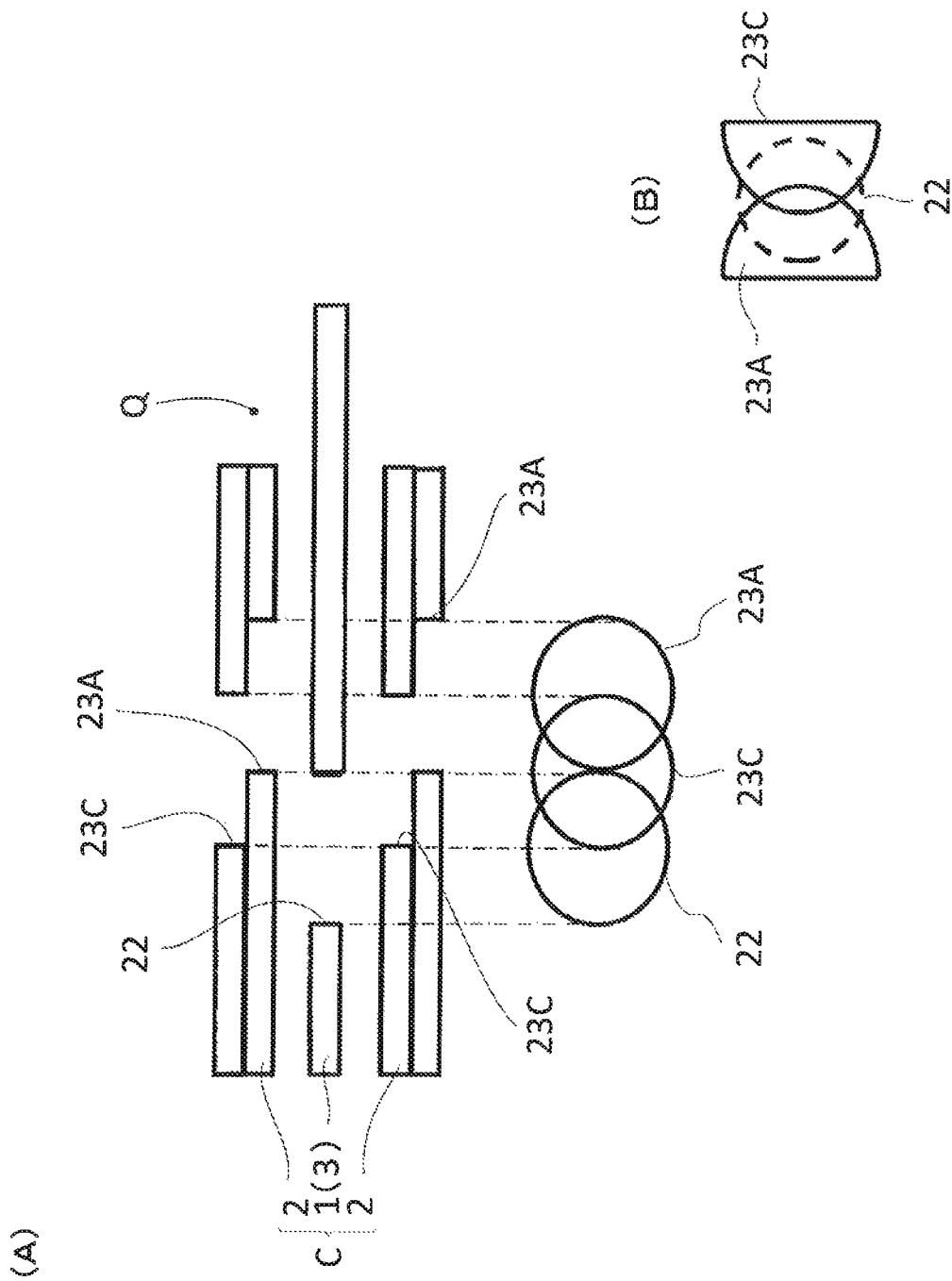
FIG. 8 are (A) an explanatory view around communication holes of a cell module according to a seventh embodiment of the present invention, illustrating the cross sections and top faces thereof, and (B) a plan view of another example of the communication holes with a different shape.

A cell structure for a fuel cell stack of FIG. 8 (A) is configured such that communication holes 23A of an anode separator 2, communication holes 23C of a cathode separator 2 and communication holes 22 of a frame 3 in each unit cell C are displaced relative to each other. All of the communication holes 22, 23A, 23C in the illustrated example have a round shape, and the communication holes 23C of the cathode separator 2 are displaced by a radius relative to the communication holes 22 of the frame 3. Further, the communication holes 23A of the anode separator 2 are displaced by a radius relative to the communication holes 23 of the cathode separator 2.

Similarly, also between adjacent unit cells C, the communication holes 23A of the anode separator 2 and the communication holes 23C of the cathode separator 2 are displaced by a radius relative to each other. That is, the communication holes 22, 23A, 23C adjacent in the cell stacking direction are displaced relative to each other.

The cell structure of the fuel cell stack having the above-described configuration allows the air in spaces Q of the unit cells C to be released to the outside as with the previous embodiments. Meanwhile, the communication holes 22, 23A, 23C adjacent in the cell stacking direction are displaced relative to each other so that water condensed from vapor produced in membrane electrode assemblies 1 is less likely to flow in the cell stacking direction. Therefore, the cell structure prevents a short circuit (liquid junction) between the unit cells C due to the water.

In a more preferred embodiment of the present invention, the cell structure for the fuel cell stack may have the communication holes adjacent in the cell stacking direction that are different from each other in at least one of size and shape. For example, as illustrated in FIG. 8 (B), the communication holes 22 of the frames 3 are formed in a round shape while the communication holes 23A, 23C of the anode and cathode separators 2 are formed in a semicircular shape, and they are displaced relative to each other.

The cell structure of the fuel cell stack having the communication holes 22, 23A, 23C can also allow the air in the spaces Q of the fuel cells C to be released to the outside. Meanwhile, the structure makes water condensed from vapor produced in the membrane electrode assemblies 1 less likely to flow in the cell stacking direction and can thereby prevent a short circuit (liquid junction) of the unit cells C due to the water.

Eighth Embodiment

Figure 9:
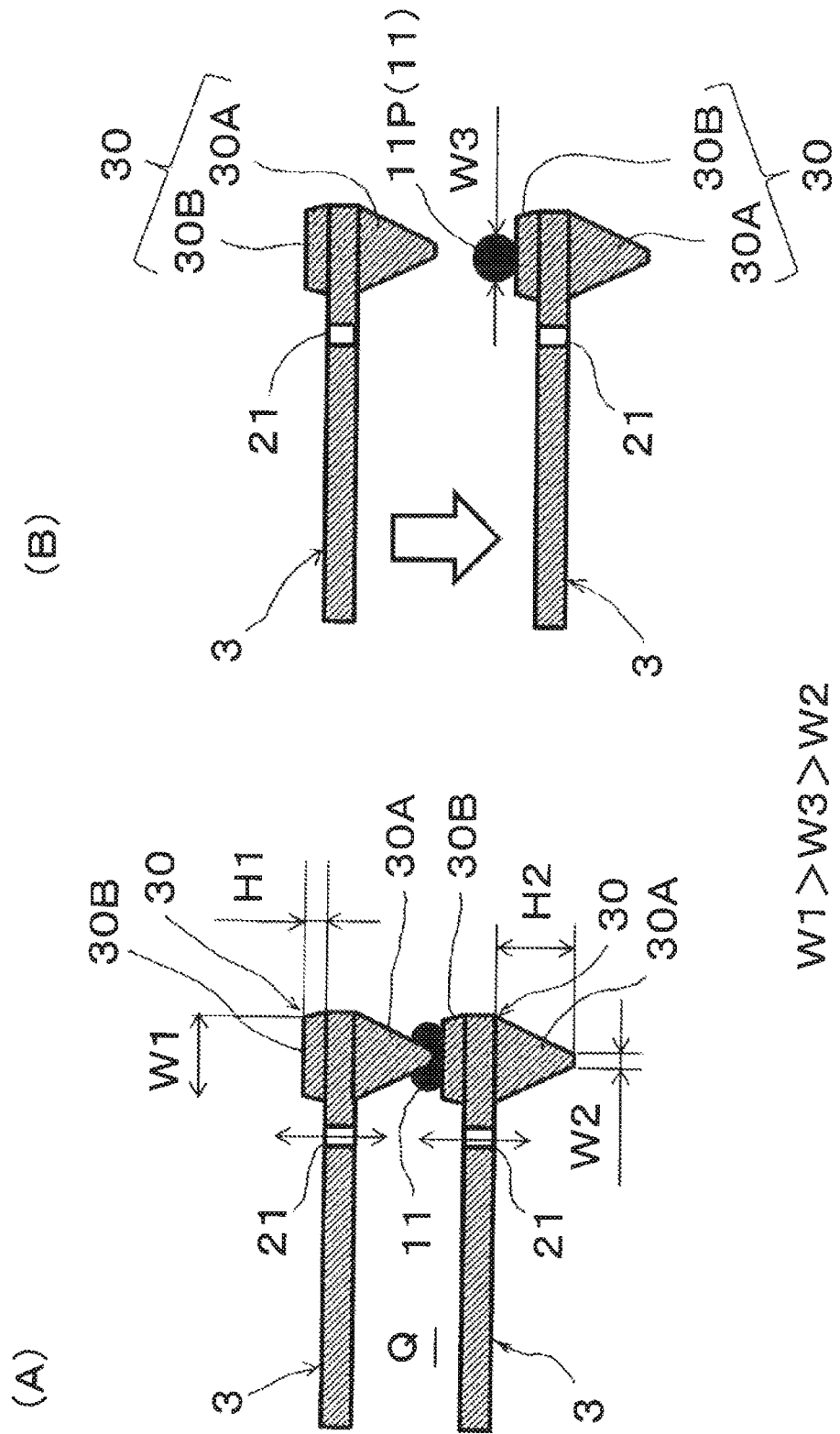
FIG. 9 are (A) a cross sectional view of a main part of a frame according to an eighth embodiment of the present invention, and (B) a cross sectional view thereof before adhesion.

In the cell structure of a fuel cell stack of FIG. 9 (A), a frame 3 of a membrane electrode assembly of each unit cell includes a thick part 30 that protrudes at least from one side at a location corresponding to a sealing part 11 between adjacent frames. The protrusion of the thick part 30 has a peaked shape that makes the sealing part 11 swell out both inward and outward of a unit cell (leftward and rightward in FIG. 9) in a cross sectional view transverse to the extending direction of the sealing part 11.

In this embodiment, the thick part 30 of the frame 3 protrudes from both sides (upper and lower sides in the figure) in the edge part of the frame 3, and both of the protrusions 30A, 30B on the respective sides have a trapezoidal shape. Specifically, both of the protrusions 30A, 30B have a trapezoidal shape that has a diagonal side at least in the outer peripheral side of the frame 3 in a cross sectional view transverse to the sealing part 11. In the illustrated example, the protrusions 30A, 30B have a trapezoidal shape that has diagonal sides in both lateral sides.

More specifically, the thick part 30 is configured such that one protrusion 30A, the lower protrusion in the figure, has a height H2 that is greater than the height H1 of the other protrusion 30B, the upper protrusion in the figure (H1<H2). Further, the protrusion 30A has an apical width W2 that is less than the apical width W1 of the other protrusion 30B, and it has a peaked shape that makes the sealing part 11 swell out both inward and outward in a cross sectional view transverse to the sealing part 11.

In order that the sealing part 11 swells out both inward and outward, the apical width W2 of the protrusion 30A is less than the width W3 of an adhesive 11P that cures to be the sealing part 11 as illustrated in FIG. 9 (B) that depicts the state before adhesion. The width W3 of the adhesive 11P is greater than the apical width W2 of the protrusion 30A but is less than the apical width W1 of the other protrusion (W1>W3>W2).

FIG. 9 illustrates only the outer peripheral sealing part 11 of the frames 3. However, an inner peripheral sealing part (e.g. see FIG. 2 (B), reference sign 12) is further disposed at the inner peripheral side thereof (the left side in the figure) to form a double sealing structure, and a ring space Q is formed between the sealing parts. For this space Q, communication holes 21 in communication with the front and back sides are formed in each of the frames 3 in the area corresponding to the space Q.

Figure 10:
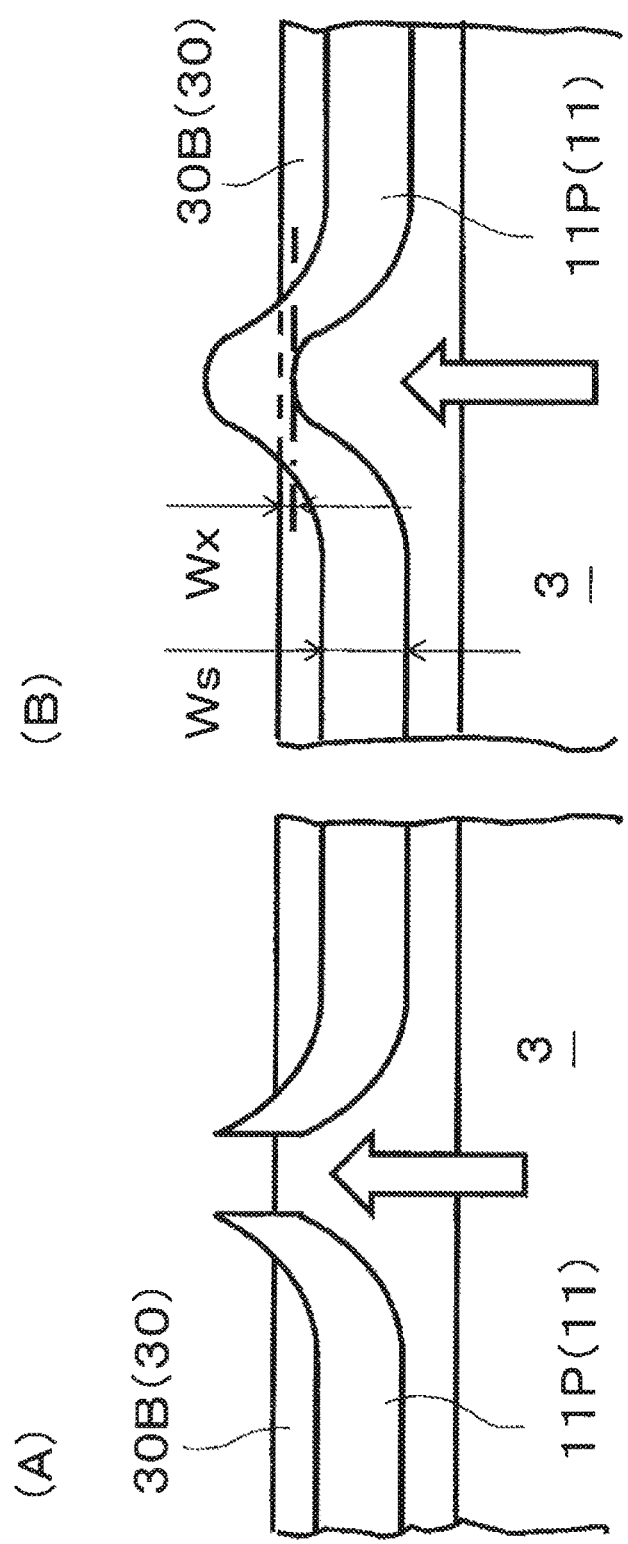
FIG. 10 are (A) a plan view of an applied adhesive that is pushed and broken by air, and (B) a plan view of an applied adhesive that is deformed by air.

As is also described in the previous embodiments, in such double sealing structures, when a load is applied in the cell stacking direction before the adhesive 11P cures, the air (arrow) confined in the space Q may push and break a part of the adhesive 11P applied in a linear shape and be released as illustrated in FIG. 10 (A). Even when the adhesive 11P cures without a release of the air, the air (arrow) compressed in the space Q may partially deform the adhesive 11P as illustrated in FIG. 10 (B), and the deformed adhesive 11P cures to be the sealing part 11 in the deformed shape. In this case, it is highly probable that the sealing width Wx at the deformed part of the sealing part 11 is by far less than the original sealing width Ws. As a result, sufficient sealing property may not be achieved.

In contrast, in the above-described cell structure for the fuel cell stack, even when a load in applied in the cell stacking direction in the production, the communication holes 21 allows the air in the spaces Q to be released to the outside or spaces Q of adjacent unit cells C as illustrated by the arrows in FIG. 9 (A). In this way, a local increase of the air pressure does not occur in the cell structure for the fuel cell stack FS. Therefore, a breakage of the adhesive, in particular the adhesive of the sealing parts 11 between the frames 3 can be prevented in fuel cell stacks having a double sealing structure in the periphery.

Further, in the cell structure for the fuel cell stack, even after the applied adhesives 11P cure to be the sealing parts 11, the air is not confined in a single space Q. Therefore, an extra stacking load and uneven surface pressure between the unit cells due to compressed air are eliminated.

Further, in the cell structure for the fuel cell stack of this embodiment, each of the frames 3 includes the thick part 30 that protrudes at least from one side, and the protrusion 30A has a peaked shape that makes the sealing part 11 swell out both inward and outward in a cross sectional view transverse to the sealing part 11. That is, the sealing part 11 is formed by squashing the adhesive 11P. Therefore, the uniform sealing width Ws of the sealing part 11 and the increased interface between the frame 3 and the sealing part 11 are achieved, and a stable sealing function is thereby obtained.

Further, in the cell structure for the above-described fuel cell stack, a dispenser is applicable for applying the adhesives 11P, or screen printing is also applicable for applying the adhesives 11P. In this embodiment, the thick parts 30 protrude from both sides of the frame 3. However, the thick parts 30 may have only the protrusions 30A, the lower protrusion in FIG. 9. In this case, the frames have a flat upper surface. Therefore, when the adhesives 11P are applied by screen printing for example, the adhesives 11P can be applied to a uniform thickness, and the quality of the sealing parts 11 becomes more stable.

Further, in the cell structure of the above-described fuel cell stack, the thick parts 30 protrude from both sides of the frames 3, and the protrusions on both sides has a trapezoidal shape that has at least a diagonal side at the outer peripheral side of the frames 3 in a cross sectional view transverse to the sealing part 11. Therefore, when the fuel cell stack has the case-integrated structure as illustrated in FIG. 1, the diagonal sides of the protrusions 30A, 30B at the outer peripheral side can prevent the edges of the frames 3 (the right edge in FIG. 9) from stress concentration due to a vibration from the case (reinforcing plates) when the edges come in contact with the reinforcing plates 58A, 58B. Further, it is also advantageous that the trapezoidal shape of the protrusions 30A, 30B provide good mold release when the frames 3 are formed by resin molding.

The configuration for the cell structure of the fuel cell stack according to the present invention is not limited to those of the above-described embodiments, and the configurations of the embodiments may be suitably combined, or changes can be made in the material, shape, number, size, arrangement or the like of the components.

REFERENCE SIGNS LIST

C Unit cell
FS Fuel cell stack
M Cell module
P Sealing plate
1 Membrane electrode assembly
2 Separator
3 Frame
11 Sealing part (sealing part between frames)
12 Sealing part (sealing part between membrane electrode assembly and separator)
21 Outer communication hole
22 Inner communication hole
23 Communication hole of separator
23A Communication hole of anode separator
23C Communication hole of cathode separator
24 Communication hole of sealing plate
30 Thick part
30A One protrusion
30B The other protrusion
31 Protrusion
52 Outer peripheral sealing member
56A End plate
56B End plate
61 Recess
62 Pathway

The invention claimed is:

1. A cell structure for a fuel cell stack that is formed by stacking unit cells each including a membrane electrode assembly and a pair of separators holding the membrane electrode assembly therebetween, wherein
the membrane electrode assembly comprises a frame in a periphery, the frame having such a size as to extend outward over edges of the separators,
first manifold holes configured to supply cathode gas are formed in corresponding positions of the separators and the frame, the first manifold holes being in communication in a cell stacking direction to form a first manifold;
second manifold holes configured to discharge cathode gas are formed in corresponding positions of the separators and the frame, the second manifold holes being in communication in the cell stacking direction to form a second manifold;

at least one communication hole in communication with front and back sides of the frame is formed in the frame in an area from a bonded part between frames adjacent in the cell stacking direction to a bonded part between the membrane electrode assembly and the separators adjacent in the cell stacking direction in an outer side of the first manifold holes and the second manifold holes with respect to the membrane electrode assembly;

the at least one communication hole is configured to allow air in a space between adjacent unit cells extending from the bonded part between frames adjacent in the cell stacking direction to the bonded part between the membrane electrode assembly and the separators adjacent in the cell stacking direction to be released to an outside of the space;

the unit cells have a double sealing structure that continues along an overall periphery and that is comprised of the bonded part between the frames adjacent in the cell stacking direction and the bonded part between the membrane electrode assembly and the separators adjacent in the cell stacking direction; and the bonded part between the frames adjacent in the cell stacking direction and the bonded part between the membrane electrode assembly and the separators adjacent in the cell stacking direction are parallel to each other along the overall periphery.

2. The cell structure for the fuel cell stack according to claim 1, wherein the at least one communication hole is formed in an area of the frame opposed to another frame adjacent in the cell stacking direction.

3. The cell structure for the fuel cell stack according to claim 1, wherein the at least one communication hole is formed in an area of the frame opposed to the separators.

4. The cell structure for the fuel cell stack according to claim 1, wherein another communication hole in communication with front and back sides of the separators is formed in the separators in an area from the bonded part between frames adjacent in the cell stacking direction to the bonded part between the membrane electrode assembly and the separators.

5. The cell structure for the fuel cell stack according to claim 1, wherein the first manifold holes and the second manifold holes are provided within an area bounded by the bonded part between the membrane electrode assembly and the separators adjacent in the cell stacking direction.

6. The cell structure for the fuel cell stack according to claim 1, wherein
the frame is rectangular and has four corners;
a plurality of communication holes in communication with the front and back sides of the frame are formed in the frame; and
at least one of the plurality of communication holes is provided in each of the four corners of the frame.

7. The cell structure for the fuel cell stack according to claim 1, wherein
a plurality of communication holes in communication with the front and back sides of the frame are formed in the frame;
the plurality of communication holes includes an outer communication hole formed in an area of the frame opposed to an adjacent frame in the cell stacking direction and an inner communication hole formed in an area of the frame opposed to one of the separators in the cell stacking direction; and the inner communication hole is closer to the membrane electrode assembly than the outer communication hole.

8. The cell structure for the fuel cell stack according to claim 1, further comprising at least one additional communication hole formed in one of the separators, wherein
the at least one communication hole formed in the frame and the at least one additional communication hole formed in one of the separators are round in shape; and
the at least one additional communication hole formed in one of the separators is displaced by a radius relative to the at least one communication hole formed in the frame.

9. A cell structure for a fuel cell stack that is formed by stacking unit cells each including a membrane electrode assembly and a pair of separators holding the membrane electrode assembly therebetween, wherein
the membrane electrode assembly comprises a frame in a periphery, the frame having such a size as to extend outward over edges of the separators,
first manifold holes configured to supply cathode gas, second manifold holes configured to discharge cathode gas, third manifold holes configured to supply anode gas, fourth manifold holes configured to discharge anode gas, fifth manifold holes configured to supply cooling fluid, and sixth manifold holes configured to discharge cooling fluid are formed in corresponding positions of the separators and the frame, the first manifold holes being in communication in a cell stacking direction to form a first manifold, the second manifold holes being in communication in the cell stacking direction to form a second manifold, the third manifold holes being in communication in the cell stacking direction to form a third manifold, the fourth manifold holes being in communication in the cell stacking direction to form a fourth manifold, the fifth manifold holes being in communication in the cell stacking direction to form a fifth manifold, and the sixth manifold holes being in communication in the cell stacking direction to form a sixth manifold;

the fuel cell stack comprises an outer sealing part and an inner sealing part, wherein the first manifold holes, the second manifold holes, the third manifold holes, the fourth manifold holes, the fifth manifold holes, and the sixth manifold holes are provided in an interior of a region bound by the inner sealing part, and the inner sealing part is provided in an interior of a region bound by the outer sealing part and is parallel to the outer sealing part along an overall periphery, adjacent frames in the cell stacking direction are bonded to each other through the outer sealing part, and the inner sealing part joins the membrane electrode assembly with the separators, the unit cells have a double sealing structure that continues along the overall periphery and that is comprised of the outer and the inner sealing parts, at least one communication hole in communication with front and back sides of the frame is formed in the frame between the outer sealing part and the inner sealing part, and the at least one communication hole is configured to allow air in a space between adjacent unit cells extending from the outer sealing part to the inner sealing part to be released to an outside of the space.

10. The cell structure for the fuel cell stack according to claim 9, wherein the at least one communication hole is formed in an area of the frame opposed to another frame adjacent in the cell stacking direction.

11. The cell structure for the fuel cell stack according to claim 9, wherein the at least one communication hole is formed in an area of the frame opposed to the separators.

12. The cell structure for the fuel cell stack according to claim 9, wherein another communication hole in communication with front and back sides of the separators is formed in the separators in an area from the outer sealing part to the inner sealing part.

13. The cell structure for the fuel cell stack according to claim 12, wherein the another communication hole of the separators is used as a holding hole in a surface treatment or a positioning hole in stacking the unit cells.

14. The cell structure for the fuel cell stack according to claim 9, wherein a predetermined number of the unit cells are stacked to form a cell module, and the fuel cell stack further comprises a sealing plate disposed between two cell modules, and
the sealing plate comprises a sealing plate communication hole in communication with front and back sides of the sealing plate and an outer peripheral sealing member that is in contact with each cell module in an outer side of the at least one communication hole.

15. The cell structure for the fuel cell stack according to claim 9, wherein the cell structure comprises a plurality of communication holes, and
wherein the plurality of communication holes in the frames adjacent in the cell stacking direction are aligned in the cell stacking direction.

16. The cell structure for the fuel cell stack according to claim 9, wherein a plurality of communication holes are formed in a plurality of locations in the frames, and at least some of the plurality of communication holes in the frames adjacent in the cell stacking direction are displaced relative to each other.

17. The cell structure for the fuel cell stack according to claim 9, wherein a protrusion for preventing liquid junction is formed along a rim of the at least one communication hole.

18. The cell structure for the fuel cell stack according to claim 9, wherein the cell structure comprises a plurality of communication holes, and
wherein the plurality of communication holes in the frames adjacent in the cell stacking direction are different from each other in at least one of shape and size.

19. A cell structure for a fuel cell stack that is formed by stacking unit cells each including a membrane electrode assembly and a pair of separators holding the membrane electrode assembly therebetween, wherein
the membrane electrode assembly comprises a frame in a periphery, the frame having such a size as to extend outward over edges of the separators,
first manifold holes configured to supply cathode gas are formed in corresponding positions of the separators and the frame, the first manifold holes being in communication in a cell stacking direction to form a first manifold;
second manifold holes configured to discharge cathode gas are formed in corresponding positions of the separators and the frame, the second manifold holes being in communication in the cell stacking direction to form a second manifold;
the fuel cell stack comprises an outer sealing part and an inner sealing part, wherein the first manifold holes and the second manifold holes are provided in an interior of a region bound by the inner sealing part, and the inner sealing part is provided in an interior of a region bound by the outer sealing part and is parallel to the outer sealing part,
adjacent frames in the cell stacking direction are bonded to each other through the outer sealing part, and the inner sealing part joins the membrane electrode assembly with the separators,
the unit cells have a double sealing structure that continues along the overall periphery and that is comprised of the outer and the inner sealing parts,
a plurality of communication holes are formed in a plurality of locations in the frames, and the fuel cell stack comprises end plates that hold a stack of the unit cells therebetween in the cell stacking direction,
each of the plurality of communication holes that is in communication with front and back sides of the frame is formed in the frame between the outer sealing part and the inner sealing part, and is configured to allow air in a space between adjacent unit cells extending from the outer sealing part to the inner sealing part to be released to an outside of the space, and
the end plates comprise recesses for absorbing pressure, the recesses disposed in locations corresponding to locations of the plurality of communication holes, and at least one pathway via which the recesses communicate with each other for equalizing pressure.

20. A cell structure for a fuel cell stack that is formed by stacking unit cells each including a membrane electrode assembly and a pair of separators holding the membrane electrode assembly therebetween, wherein
the membrane electrode assembly comprises a frame in a periphery, the frame having such a size as to extend outward over edges of the separators,
first manifold holes configured to supply cathode gas are formed in corresponding positions of the separators and the frame, the first manifold holes being in communication in a cell stacking direction to form a first manifold;
second manifold holes configured to discharge cathode gas are formed in corresponding positions of the separators and the frame, the second manifold holes being in communication in the cell stacking direction to form a second manifold;
the fuel cell stack comprises an outer sealing part and an inner sealing part, wherein the first manifold holes and the second manifold holes are provided in an interior of a region bound by the inner sealing part, and the inner sealing part is provided in an interior of a region bound by the outer sealing part and is parallel to the outer sealing part,
adjacent frames in the cell stacking direction are bonded to each other through the outer sealing part, and the inner sealing part joins the membrane electrode assembly with the separators,
the unit cells have a double sealing structure that continues along the overall periphery and that is comprised of the outer and the inner sealing parts,
at least one communication hole in communication with front and back sides of the frame is formed in the frame between the outer sealing part and the inner sealing part,
the at least one communication hole is configured to allow air in a space between adjacent unit cells extending from the outer sealing part to the inner sealing part to be released to an outside of the space, the frame comprises a thick part that protrudes at least from one side at a location corresponding to the outer sealing part, and a protrusion of the thick part has a peaked shape that makes the outer sealing part swell out to both inward and outward of a unit cell in a cross sectional view transverse to an extending direction of the outer sealing part.

21. The cell structure for the fuel cell stack according to claim 20, wherein the thick part of the frame protrudes from both sides in an edge part of the frame, and protrusions on both sides have a trapezoidal shape with a diagonal side at least in an outer side of the frame in a cross sectional view transverse to the extending direction of the outer sealing part, and one of the protrusions has a height greater than a height of the other of the protrusions and has an apical width less than an apical width of the other of the protrusions, so as to have a peaked shape that makes the outer sealing part swell out to both inward and outward of a unit cell in a cross sectional view transverse to the extending direction of the outer sealing part.

22. A cell structure for a fuel cell stack that is formed by stacking unit cells each including a membrane electrode assembly and a pair of separators holding the membrane electrode assembly therebetween, wherein the membrane electrode assembly comprises a frame in a periphery, the frame having such a size as to extend outward over edges of the separators, first manifold holes configured to supply cathode gas are formed in corresponding positions of the separators and the frame, the first manifold holes being in communication in a cell stacking direction to form a first manifold;

second manifold holes configured to discharge cathode gas are formed in corresponding positions of the separators and the frame, the second manifold holes being in communication in the cell stacking direction to form a second manifold;

at least one communication hole in communication with front and back sides of the frame is formed in the frame in an area from a bonded part between frames adjacent in the cell stacking direction to a bonded part between the membrane electrode assembly and the separators adjacent in the cell stacking direction in an outer side of the first manifold holes and the second manifold holes with respect to the membrane electrode assembly;

the at least one communication hole is configured to allow air in a space between adjacent unit cells extending from the bonded part between frames adjacent in the cell stacking direction to the bonded part between the membrane electrode assembly and the separators adjacent in the cell stacking direction to be released to an outside of the space;

the unit cells have a double sealing structure that continues along the overall periphery and that is comprised of the bonded part between the frames adjacent in the cell stacking direction and the bonded part between the membrane electrode assembly and the separators adjacent in the cell stacking direction;

the bonded part between the frames adjacent in the cell stacking direction and the bonded part between the membrane electrode assembly and the separators adjacent in the cell stacking direction are parallel to each other;

the frame comprises a thick part that protrudes at least from one side at a location corresponding to the bonded part between adjacent frames, and a protrusion of the thick part has a peaked shape that makes the bonded part swell out to both inward and outward of a unit cell in a cross sectional view transverse to an extending direction of the bonded part.

23. The cell structure for the fuel cell stack according to claim 22, wherein the thick part of the frame protrudes from both sides in an edge part of the frame, and protrusions on both sides have a trapezoidal shape with a diagonal side at least in an outer side of the frame in a cross sectional view transverse to the extending direction of the bonded part, and one of the protrusions has a height greater than a height of the other of the protrusions and has an apical width less than an apical width of the other of the protrusions, so as to have a peaked shape that makes the bonded part swell out to both inward and outward of a unit cell in a cross sectional view transverse to the extending direction of the bonded part.

* * * * *